(12) United States Patent
Waller

(10) Patent No.: US 8,839,302 B2
(45) Date of Patent: Sep. 16, 2014

(54) LAUNCHING AN APPLICATION FROM A BROADCAST RECEIVING APPARATUS

(75) Inventor: Arthur Simon Waller, Surrey (GB)

(73) Assignee: Samsung Electronics Co., Ltd., Suwon-si (KR)

(*) Notice: Subject to any disclaimer, the term of this patent is extended or adjusted under 35 U.S.C. 154(b) by 60 days.

(21) Appl. No.: 13/529,072

(22) Filed: Jun. 21, 2012

(65) Prior Publication Data

US 2013/0019265 A1 Jan. 17, 2013

Related U.S. Application Data

(60) Provisional application No. 61/507,795, filed on Jul. 14, 2011.

(51) Int. Cl.
| | | |
|---|---|---|
| H04N 7/10 | (2006.01) | |
| H04N 7/025 | (2006.01) | |
| G06F 3/00 | (2006.01) | |
| G06F 13/00 | (2006.01) | |
| H04N 5/445 | (2011.01) | |
| H04N 7/16 | (2011.01) | |
| H04N 21/443 | (2011.01) | |
| H04N 21/472 | (2011.01) | |

(52) U.S. Cl.
CPC .............. *H04N 21/47202* (2013.01); *H04N 21/443* (2013.01)
USPC ............. 725/51; 725/32; 725/36; 725/61

(58) Field of Classification Search
None
See application file for complete search history.

(56) References Cited

U.S. PATENT DOCUMENTS

| | | | | |
|---|---|---|---|---|
| 7,174,512 | B2* | 2/2007 | Martin et al. | 715/719 |
| 7,877,465 | B2* | 1/2011 | Kontamsetty et al. | 709/220 |
| 7,904,923 | B2* | 3/2011 | Putterman et al. | 725/43 |
| 8,028,237 | B2* | 9/2011 | Schmitt | 715/744 |
| 8,250,614 | B1* | 8/2012 | Ellis et al. | 725/87 |
| 2003/0078972 | A1* | 4/2003 | Tapissier et al. | 709/204 |
| 2004/0073950 | A1* | 4/2004 | Tan et al. | 725/135 |
| 2005/0283800 | A1* | 12/2005 | Ellis et al. | 725/40 |
| 2006/0026641 | A1* | 2/2006 | Jule et al. | 725/44 |
| 2008/0040767 | A1* | 2/2008 | McCarthy et al. | 725/132 |
| 2008/0095227 | A1* | 4/2008 | Gan et al. | 375/240.01 |
| 2012/0079512 | A1* | 3/2012 | Nambakkam et al. | 725/4 |
| 2012/0278844 | A1* | 11/2012 | Curtis et al. | 725/93 |

* cited by examiner

*Primary Examiner* — Brian T Pendleton
*Assistant Examiner* — Jonathan V Lewis
(74) *Attorney, Agent, or Firm* — Sughrue Mion, PLLC

(57) ABSTRACT

An apparatus for receiving a broadcast stream, and a method for use of the apparatus, are disclosed. The apparatus includes an application portal for launching a predefined application. The apparatus receives application information including identification ID information which identifies an application and protocol information which indicates a protocol to be used to launch the identified application, and launches the predefined application from the application portal in response to the ID information identifying the predefined application and the protocol information indicating the application portal. The apparatus may be arranged to only launch the identified application from the portal in response to the predefined application has at least the minimum version number. The application information can be received as an Application Information Table (AIT), and the ID information can be provided as organization_id and application_id fields in the AIT.

21 Claims, 4 Drawing Sheets

FIG. 2

| AIT FIELD | VALUE |
|---|---|
| application type | As required |
| organization_id ~210 | Defined by app. provider |
| application_id | Defined by app. provider |
| application_control_code | Not used |
| application_descriptor() | |
|     application_profile_length | 0 |
|     service_bound_flag | Set as required |
|     visibility | Not used |
|     application_priority | Set as required |
|     transport_protocol_label | |
| transport_protocol_descriptor() | |
|     protocol_id ~220 | PORTAL |
|     selector_bytes | Minimum app. version |
| simple_application_location_descriptor() | |
|     initial_path_bytes | App. parameters |

LAUNCHING AN APPLICATION FROM A BROADCAST RECEIVING APPARATUS

FIELD

The present inventive concept relates to launching an application from a broadcast receiving apparatus. More particularly, the present inventive concept relates to launching a predefined application from an application portal in the broadcast receiving apparatus, in response to the received application information indentifying the predefined application and indicating the portal.

BACKGROUND

In recent years, broadcast receivers such as televisions (TVs) and set-top boxes (STBs) have been developed which can connect to a network such as a local area network or the Internet. Such receivers are generally referred to as 'connected' receivers, for example a 'connected TV' or a 'connected STB'. Most connected receivers also include an application portal from which a user can launch one of a plurality of applications to access online content through the network connection. For example, the user may make a selection to launch a video-on-demand (VOD) application to view online content.

The portal takes the form of a graphical user interface (GUI) which the user can navigate in order to select and launch the desired application. The portal is normally pre-installed by the receiver manufacturer. The applications accessible from the portal have been tested by the manufacturer to verify compatibility with the hardware and software environment of that particular receiver. Different receivers from different manufacturers may use completely different operating environments, including but not limited to Hypertext Markup Language (HTML), Adobe Flash (registered trade mark of Adobe Systems Inc.), or Microsoft Silverlight (registered trade mark of Microsoft Inc.).

Also, broadcasting standards have been developed which enable a broadcaster to provide additional signaling in the broadcast stream to launch an application on the receiver. The application could be launched automatically using an auto-start function, or could be launched in response to user input. However, because there is no standard set of applications that will be available through different manufacturer's portals, it is not possible for the broadcaster to remotely launch an application from the application portal since the broadcaster cannot know which applications will be available. Instead, the broadcaster has to provide the application itself through the broadcast stream, or from a web server accessed using a uniform resource locator (URL) in the broadcast stream.

The inventive concept is made in this context.

SUMMARY

According to the present inventive concept, there is provided a method for use in an apparatus for receiving a broadcast stream, the apparatus including an application portal for launching a predefined application, the method includes receiving application information including identification (ID) information for identifying an application and protocol information indicating a protocol to be used to launch the identified application, and launching the predefined application from the application portal in response to the ID information identifying the predefined application and the protocol information indicates the application portal.

The method may further include, prior to receiving the application information, receiving an application information source identifier for identifying a network location from which the application information can be obtained, and connecting to the network location to receive the application information.

The method may further include selecting one of a plurality of broadcast services from the broadcast stream, the broadcast stream including information identifying a broadcast application associated with the selected broadcast service, and launching the broadcast application, wherein the predefined application is launched from the application portal in response to a command from the broadcast application.

The predefined application may be a catch-up application for accessing online content through a network connection, and the method may further include controlling a display device to display an Electronic Programme Guide (EPG) in a user interface for selecting one of a plurality of broadcast events, and receiving a user command selecting one of the broadcast events, wherein the predefined application can be launched to access content which corresponds to the selected broadcast event.

The EPG may include online availability information which indicates whether the content which corresponds to the selected broadcast event is available online, and the predefined application may only be launched in response to the online availability information identifying that the content which corresponds to the selected broadcast event is available online.

The application information may include version information for specifying a version of the application identified by the ID information.

The version information may specify a minimum version number of the identified application, and the predefined application may only be launched from the application portal in response to the predefined application having at least the minimum version number.

The application information may include application type information for identifying a type of the application, and the method may further include determining whether to launch the predefined application based on the application type.

The application type information can identify the application as being one of a Multimedia and Hypermedia Experts Group (MHEG) application, a HyperText Markup Language (HTML) application, a Multimedia Home Platform (MHP) application, or a Hybrid Broadcast Broadband Television (HbbTV) application.

The application information may further include an application source identifier which identifies a network location from which the application can be obtained, and the method may further include connecting to the network location to launch the application in response to a determination that the ID information does not identify the predefined application.

The apparatus may be a Digital Video Broadcasting (DVB) receiver and the application information may be received as an Application Information Table (AIT), and the method may further include comparing organization_ID and application_ID values in the received AIT to known organization_ID and application_ID values of the predefined application, in order to determine whether the ID information identifies the predefined application.

According to the present inventive concept, there is also provided a computer-readable storage medium storing a computer program which, when executed by an apparatus for receiving a broadcast stream, causes the apparatus to perform the method.

According to the present inventive concept, there is further provided an apparatus for receiving a broadcast stream, the apparatus including an application portal for launching a predefined application, the apparatus including a receiving module arranged to receive application information, the application information including identification (ID) information for identifying an application and protocol information indicating a protocol to be used to launch the identified application, and a portal control module arranged to launch the predefined application from the application portal in response to the ID information indentifying the predefined application and the protocol information indentifying the application portal.

The apparatus may be arranged to receive, prior to receiving the application information, an application information source identifier for identifying a network location from which the application information can be obtained, and the receiving module may be arranged to connect to the network location to receive the application information.

The apparatus may further include a broadcast service selection module arranged to select one of a plurality of broadcast services from the broadcast stream, the broadcast stream including information which indentifies a broadcast application associated with the selected broadcast service, and a broadcast application module arranged to launch the broadcast application, wherein the portal control module may be arranged to launch the predefined application from the application portal in response to a command from the broadcast application.

The predefined application may be a catch-up application for accessing online content through a network connection, and the apparatus may further comprise an Electronic Programme Guide (EPG) user interface generator arranged to control a display device to display an EPG user interface for selecting one of a plurality of broadcast events, and a user input module arranged to receive a user command selecting one of the broadcast events, wherein the portal control module may be arranged to launch the predefined application to access online content which corresponds to the selected broadcast event.

The EPG may include online availability information indicating whether the content which corresponds to the selected broadcast event is available online, and the portal control module may be arranged to only launch the predefined application in response to the online availability information indicating that the content which corresponds to the selected broadcast event is available online.

The application information may include version information for specifying a version of the application identified by the ID information.

The version information may specify a minimum version number of the identified application, and the portal control module may be arranged to only launch the predefined application from the application portal in response to the predefined application having at least the minimum version number.

The application information may include application type information for identifying a type of the application, and the portal control module may be arranged to determine whether to launch the predefined application based on the application type.

The application information may further include an application source identifier for identifying a network location from which the application can be obtained, and the apparatus may further include a network interface module arranged to connect to the network location to launch the application if in response to a determination that the ID information does not identify the predefined application.

The apparatus may be a Digital Video Broadcasting (DVB) receiver and the application information may be received as an Application Information Table (AIT), and the portal control module may be arranged to compare organization_ID and application_ID values in the received AIT to known organization_ID and application_ID values of the predefined application, to determine whether the ID information identifies the predefined application.

According to an exemplary embodiment of the inventive concept an apparatus may include a receiving module which receives application information including identification ID information and protocol information; and a portal control module configured to launch the predefined application in response to the ID information identifying the predefined application and the protocol information. The portal control module may be within the application portal. The protocol information indicates a protocol to be used to launch the identified application. In addition, the protocol information indicates the application protocol.

BRIEF DESCRIPTION OF THE DRAWINGS

Embodiments of the present inventive concept will now be described, by way of example only, with reference to the accompanying drawings, in which:

FIG. 2 illustrates application information received by the apparatus of FIG. 1, according to an exemplary embodiment of the present inventive concept;

DETAILED DESCRIPTION

Figure 1:
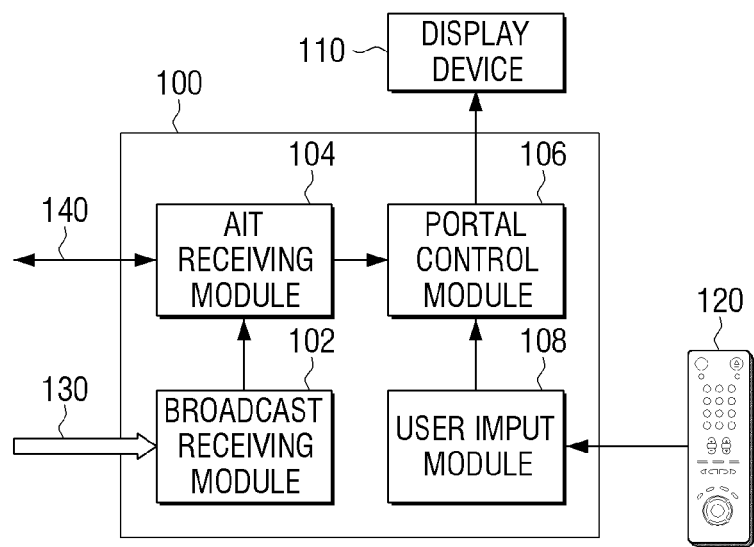
FIG. 1 illustrates an apparatus for receiving a broadcast stream, according to an exemplary embodiment of the present inventive concept.

Referring now to FIG. 1, an apparatus for receiving a broadcast stream is illustrated according to an exemplary embodiment of the present inventive concept. As shown in FIG. 1, the apparatus 100 comprises a broadcast receiving module 102 for receiving a broadcast stream 130, an Application Information Table (AIT) receiving module 104 for receiving application information via a network connection 140, a portal control module 106, and a user input module 108 for receiving signals from a control device 120, such as a remote control. The structure illustrated in FIG. 1 is shown for illustrative purposes only and the inventive concept is not limited to this particular structure. The modules may be embodied as discrete hardware modules or as software modules in a computer program to be executed by a broadcast receiving apparatus. In general, any structure may be used that provides the desired functionality.

In the present exemplary embodiment, the apparatus 100 is a Digital Video Broadcasting (DVB) compliant STB connectable to a display device 110, for example a television or projector. Also, the apparatus 100 is a connected STB since it is able to connect to a network to send and receive data, for example to request and receive online content. Although in FIG. 1 the AIT receiving module 104 is shown accessing the network connection 140, other components of the apparatus 100 may also access the network connection 140 as and when required. In other embodiments, the broadcast receiving apparatus 100 could be integral with the display device 110, e.g. could be included in a digital television. The portal control module 106 is arranged to perform control functions associated with an application portal installed on the broadcast receiving apparatus 100. Since the portal takes the form of a GUI, the portal control module 106 is arranged to receive signals from the control device 120 via the user input module 108, generate visual information in accordance with the control signals, for example by highlighting an icon currently selected by the user, and send the visual information to the display device 110 to be displayed as the portal GUI. If the application portal GUI is to be displayed overlaid on other images, for example overlaid on video of a programme currently being viewed on the display device, the visual information can be combined with the other image data before being sent to the display device 110.

The portal control module 106 is further arranged to launch a selected portal application in response to a command to launch the application. The command could be received from a user, or from another application currently being executed on the broadcast receiving apparatus 100. The portal applications are applications which have been defined as being compatible with the operating environment of the broadcast receiver 100, and which are capable of being launched from the portal. The apparatus 100 can store a record of the portal applications, including identification information for identifying each application. In some exemplary embodiments, updated versions of previously-installed portal applications can be received and installed, for example via the broadcast stream 130 or the network connection 140, in which case the record can also be updated to reflect the updated version number for that application. A portal application can therefore be referred to as a 'predefined' application in the sense that it is an application that is already known to the portal, and which can therefore be selected and launched from the portal.

Preferably, the portal applications may be pre-installed on the apparatus 100 so that they can be launched immediately, if selected. However, this is not essential. The record of portal applications held by the apparatus can also include ID information for other portal applications that are not currently installed, in which case the stored record can also indicate a source from which the portal application can be installed if and when it is required. As an example, a Uniform Resource Locator (URL) may be stored for any given application, and if it is required to install that application, the apparatus 100 can connect via the network connection 140 to a server identified by the URL to receive the application. Other approaches are also possible. For example, a portal application could be obtained from an object carousel in the broadcast stream 130.

Continuing with reference to FIG. 1, the apparatus 100 is arranged to enable a broadcaster to launch a portal application from the portal, thereby ensuring that the application that is launched is one which is fully compatible with the particular apparatus in question. To achieve this, the broadcaster provides application information that includes identification ID information for identifying an application, and further includes protocol information indicating a protocol to be used to launch the identified application. In exemplary embodiments of the present inventive concept, the protocol information can indicate that the portal is to be used to launch the application. In response to the portal being indicated, the portal control module 106 can compare the ID information with stored ID information for the portal applications in order to determine whether the required application is available from the portal in this particular apparatus 100. In response to the correct application being available, the portal control module 106 can then launch the identified application from the portal.

In the present embodiment, the application information is received as an AIT by the AIT receiving module 104. The broadcaster provides a URL in the broadcast stream 130 that points to a web server from which the AIT can be obtained. The broadcast receiving module 102 passes the URL to the AIT receiving module 104, which connects to the web server via the network connection 140 to request and receive the AIT. However, in other exemplary embodiments the AIT may be received differently. For example, the AIT could be provided by the broadcaster in the broadcast stream 130, in which case the AIT may be received through the broadcast receiving module 102. In such a case the function of the AIT receiving module 104 can be performed by the broadcast receiving module 102, and so the separate AIT receiving module 104 may be omitted.

The structure of a received AIT for a portal application is illustrated in FIG. 2. In the present embodiment, the AIT structure is similar to a conventional AIT, but also includes extensions that allow the broadcaster to specify an application which is located on the portal, i.e. is one of the predefined portal applications. The existing organization_id and application_id fields 210 in the AIT are used as the ID information to identify one of the portal applications, and the broadcast receiving apparatus 100 stores a record of the known organization_id and application_id values for each portal application. In other embodiments however the ID information could be provided in a different form.

In addition to the ID information, the AIT includes the protocol information in the form of a protocol_id field 220. In the present exemplary embodiment, a new value of the protocol_id field 220 is defined to indicate that the application is on the portal, i.e. is a portal application. Any bit value of the protocol_id field 220 could be chosen to denote the portal, provided that value is not already reserved for indicating a particular type of transport protocol. Therefore, the modified AIT of the present exemplary embodiment cannot also carry information about the actual transport protocol to be used to obtain the application, because the protocol_id field 220 is already being used for another purpose, i.e. to indicate that the application is a portal application. However, as described above, because the portal applications are predefined the apparatus can already have a record of ID information for each portal application, and this record can further include transport protocol information about the transport protocol to be used to obtain that application, if it is not already installed. Therefore for portal applications, the received AIT does not need to indicate specific transport protocol to be used to obtain the application since, this is already known.

Additionally, different portals can use different transport protocols, for example different portals may use different protocols even when obtaining the same application. The transport protocol to be used can be determined by the portal itself, for instance the portal can be pre-programmed to use a particular transport protocol to obtain new applications. This approach has the advantage that the broadcaster does not need to be aware of the particular transport protocol to be used by the portal.

Also, as shown in FIG. 2 the transport_protocol_descriptor( ) of the received AIT includes a selector_bytes field in addition to the protocol_id field 220. As explained above, for a portal application it is not necessary to specify a transport protocol since this is already known to the device. Therefore when the protocol_id indicates the portal, the selector_bytes field can be used to carry additional information relating to the application. In the present exemplary embodiment, the selector_bytes field is used to carry the minimum required application version number. The platform profile is not used because the apparatus already knows that the application can be launched from the portal. Therefore, as shown in FIG. 2, in the present exemplary embodiment, the application_profile_length has a value of zero since an application_profile is not provided.

Regarding other fields of the AIT of FIG. 2, when the AIT is used to signal a portal application as in the present exemplary embodiment, the application_type can indicate a type associated with the application in the portal. If necessary, the broadcaster can use the application_type value to distinguish between different implementations of its application that may have been developed. The control code, platform profile and application visibility are not required for a portal application. Finally, the initial_path_bytes can carry parameters to be passed to the portal application. For example in response to the portal application being a catch-up service these parameters can be used by the application to request the corresponding content.

Figure 3:
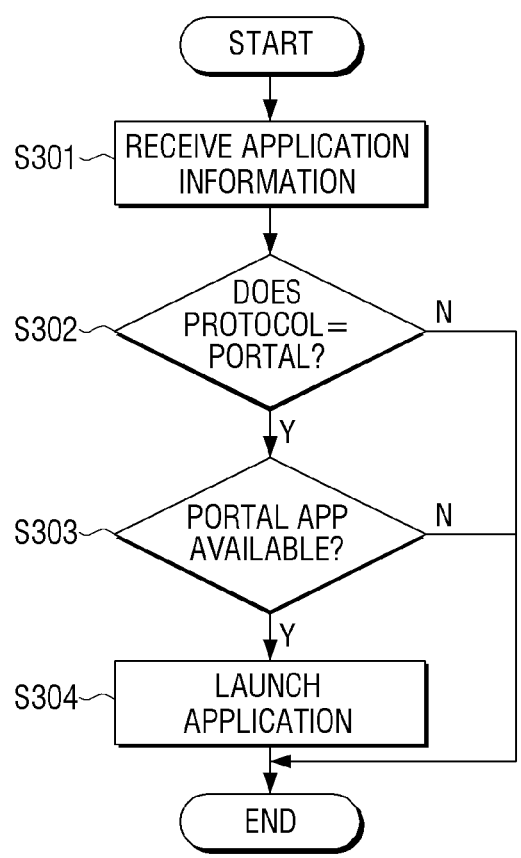
FIG. 3 illustrates a method of determining whether to launch a portal application, according to an exemplary embodiment of the present inventive concept.

Referring now to FIG. 3, a method for determining whether to launch a portal application is illustrated, according to an exemplary embodiment of the present inventive concept. The method can be performed by the broadcast receiving apparatus 100 of FIG. 1. In the first step S301 the apparatus receives the application information, for instance in the form of an AIT. Then, in step S302 the received application information is checked to determine whether the protocol information indicates the application portal. If the portal is not indicated, a portal application will not be launched. However, in response to the portal being indicated, then in step S303 it is checked to determine whether the application is available on the portal. Here, the apparatus compares the received ID information to a known ID value (or values) of the portal application. When the ID information is received as organization_id and application_id values in the AIT, the received values are compared to known organization_id and application_id values of the portal application. Also, if the portal included in the apparatus has a plurality of portal applications defined, the received ID information can be compared with the known ID values of all the predefined portal applications in order to determine whether one of the portal applications is identified by the application information.

If the received ID information does not match the known values of any portal applications, it is determined that the requested application is not available from the portal for this particular apparatus. In this case, a portal application will not be launched. However, if a match is found, then it is determined that the requested application, i.e. the application signalled by the broadcaster, is available from the portal. In this case, the apparatus proceeds to step S304 and launches the identified portal application from the portal.

In more detail, at step S304 the identified application can be launched automatically, or launching the application can be conditional on other criteria being met. Various approaches are possible in different situations. As an example, one of a plurality of broadcast services may be selected from the broadcast stream to be viewed, for example may be selected by a user or automatically selected by the apparatus based on a previously set reminder. The broadcast stream can include information identifying a broadcast application associated with the selected broadcast service, which can be launched either automatically or in response to another event such as a user command to launch the application. Once the associated application is launched, the application itself can issue a command to launch the portal application identified by the received AIT, i.e. the portal application can be launched by another application.

In another example, the received AIT may identify a portal application which is a catch-up application for accessing online content through the network connection. The apparatus can control the display device to display an Electronic Programme Guide EPG user interface for selection by a user, of one of a plurality of broadcast events being displayed on the display device. The EPG can be displayed when requested by a user. The user can then input a command selecting one of the broadcast events, at which point the identified portal application can be launched to access content which corresponds to the selected broadcast event. Furthermore, in some embodiments, the EPG can include online availability information which indicates whether the content which corresponds to the selected broadcast event being available online. For example, the content may have been already broadcast in response to the selected broadcast event being an event occurring in the past or is a repeat of a previous broadcast event, in which case the content can be accessed online via a catch-up service. Alternatively, the content may correspond to a future broadcast event but may be accessible to certain users, for example, upon payment of a fee. In such cases, the apparatus may be arranged to only launch the predefined application in response to the online availability information indicating that the content which corresponds to the selected broadcast event being available online.

Figure 4:
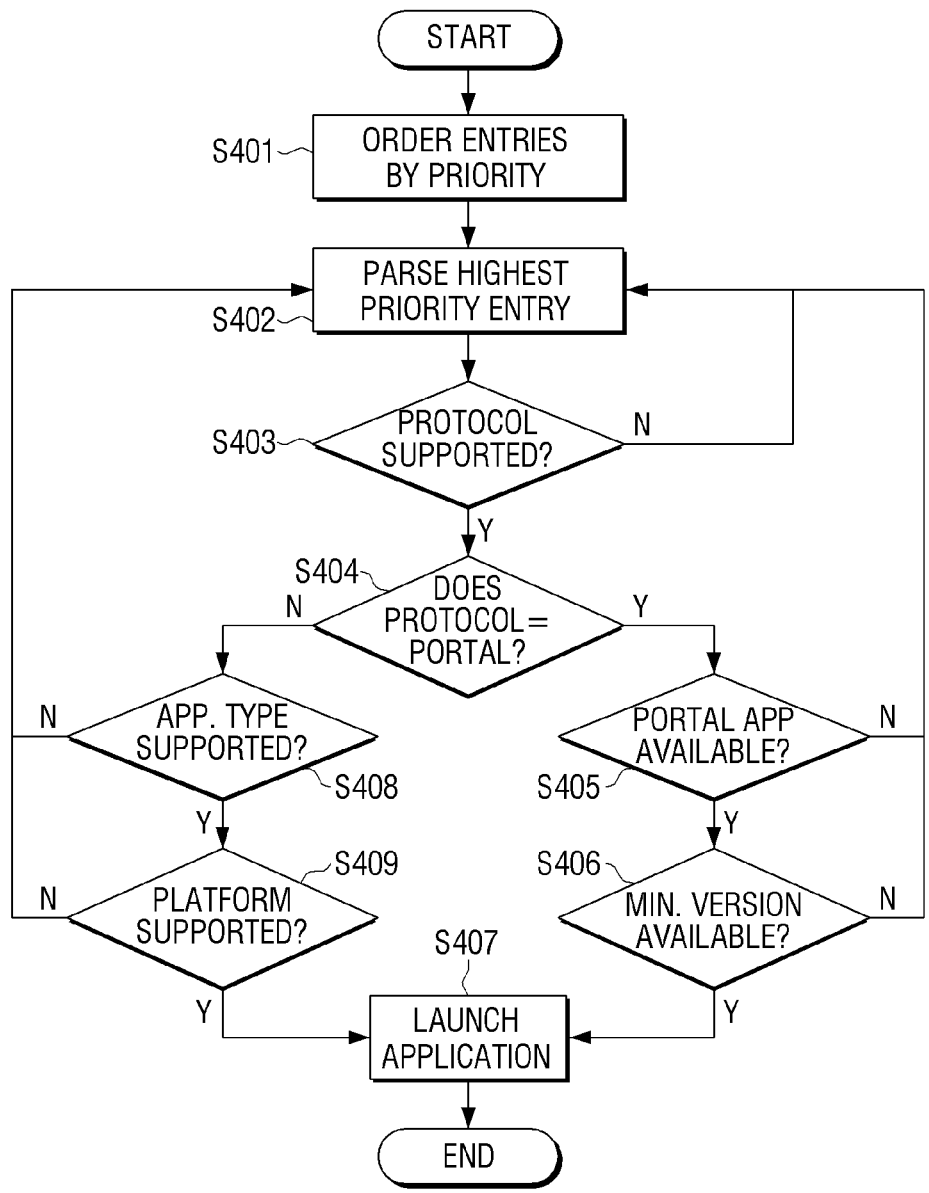
FIG. 4 illustrates a method of selecting one of a plurality of applications having different priority levels, according to an exemplary embodiment of the present inventive concept.

Referring now to FIG. 4, a method for selecting one of a plurality of applications having different priority levels is illustrated, according to an exemplary embodiment of the present inventive concept. It is known in conventional broadcast systems to define a plurality of applications each having a different priority, such that the available application with the highest priority is launched. However, in the present exemplary embodiment this is extended to scenarios in which one or more of the applications in the priority sequence is a portal application.

First, application information for each one of the plurality of applications is received. The application information for each application indicates the priority level of that application, for example using the application_priority field of an AIT as shown in FIG. 2. In step S401, the apparatus orders the entries in the received application information according to the priority levels. Then, in step S402 the application information for the highest priority entry is parsed. In step S403, in response to the protocol information indicating a transport protocol that is not supported, the apparatus discards that entry, returns to step S402 and continues for the next highest priority entry. On the other hand, in response to the protocol information indicating a transport protocol that is supported, including the 'portal' value, the apparatus proceeds to step S404 and checks whether the protocol information indicates the portal.

If the portal is indicated, then in step S405 a determination is made as to whether the ID information identifies one of the portal applications available from the portal in this particular apparatus, by comparing the ID information against known ID values of the portal applications. If no match is found, a determination is made that the requested application is not available, so the entry is discarded and the apparatus returns to step S402 to parse the next highest entry. On the other hand, in response to a match being found, it is determined that the application is available to be launched from the portal. Then, in step S406, a minimum version number included in the application information is checked against the version number of the available portal application. If the portal application does not have the minimum version number, i.e. is an older version, the apparatus discards the entry and returns to step S402. In some exemplary embodiments, however, the apparatus may first check to determine whether an updated version of the application is available for the portal, for example by querying an online database maintained by the apparatus manufacturer. On the other hand, in response to a determination in step S406 that the portal application has at least the minimum version number, then in step S407, the application is launched.

In the present embodiment, step S406 of the method allows a broadcaster to set a minimum required version number of the application as an additional filter to be used when determining whether to launch an application. Nevertheless, in some embodiments, step S406 could be omitted. For example, in response to the desired functionality of the application being available in all versions, the minimum version number could be omitted entirely, in which case it would not be necessary to carry out the comparison at step S406.

Continuing with reference to FIG. 4, in response to a determination in step S404 that the portal is not indicated, then the apparatus proceeds to step S408 and S409 to check whether the application type and platform are supported by the apparatus. If either is not supported, the application cannot be launched and the entry is discarded before returning to step S402 to parse the entry at the next highest priority level. However, in response to both being supported, then the application can be launched at step S407.

For example, a method such as the one shown in FIG. 4 can be used when a received AIT contains information for three versions of the same application, i.e., each entry has the same ID information. The highest priority entry indicates a portal application with an application_type of HTML and an application version number of v3. The next highest entry indicates a broadband application with an application_type of HbbTV. Finally, the lowest priority entry indicates a broadband application with an application_type of MHEG. Following the method shown in FIG. 4, an apparatus with v3 of the application on its portal would launch the portal version, an apparatus with v2 on its portal but which implements HbbTV would launch the HbbTV version, and an apparatus with v2 on its portal but no HbbTV browser would launch the MHEG version.

As described above, exemplary embodiments of the present inventive concept can enable a broadcaster to indicate to a receiver that a portal application should be launched. The broadcaster does not need to know which particular portal applications are available on that receiver, but instead the receiver is able to use the received application information to determine whether it has the required application on its portal. In this way the broadcaster can ensure that the portal application will always be launched whenever it is available, ensuring the most reliable service since the portal applications by definition are known to be compatible with the receiver in question.

Although exemplary embodiments of the present inventive concept have been described in relation to the DVB standard, the person of ordinary skill in the art will understand that the same principles can be applied to embodiments in which a different broadcasting standard is used. For example, embodiments of the present inventive concept may use another standard such as the Open IPTV Forum (OIPF) standard, Advanced Television Systems Committee (ATSC) standard, or the Digital Entertainment Content Ecosystem (DECE) standard. In such cases the application information may not be received as an AIT, but could be received in another format compatible with whichever standard is being used.

Whilst certain embodiments of the present invention have been described above, the skilled person will understand that many variations and modifications are possible without departing from the scope of the invention as defined in the claims.

The invention claimed is:

1. A method for use in an apparatus for receiving a broadcast stream, where the apparatus includes an application portal for launching a predefined application, the method comprising:
   receiving application information including identification ID information for identifying the predefined application and receiving protocol information indicating a protocol to be used to launch the identified predefined application; and
   determining whether the predefined application is available from the application portal by comparing the identification ID information for identifying the predefined application with identification ID information for the application portal in response to the ID information identifying the predefined application and the protocol information indicating the application portal and launching the predefined application from the application portal.

2. The method of claim 1, wherein prior to receiving the application information:
   receiving an application information source identifier for identifying a network location from which the application information can be obtained; and
   connecting to the network location to receive the application information.

3. The method of claim 2, further comprising:
   selecting one of a plurality of broadcast services from the broadcast stream including information identifying a broadcast application associated with the selected broadcast service; and
   launching the broadcast application,
   wherein the predefined application is launched from the application portal in response to a command from the broadcast application.

4. The method of claim 1, wherein the predefined application is a catch-up application for accessing online content through a network connection, the method further comprising:
   controlling a display device to display an Electronic Programme Guide (EPG) user interface for selecting one of a plurality of broadcast events; and
   receiving a user command of selecting one of the broadcast events,
   wherein the predefined application is launched to access content which corresponds to the selected broadcast event.

5. The method of claim 4, wherein the EPG includes online availability information which indicates whether the content which corresponds to the selected broadcast event is available online, and
   wherein the predefined application is only launched in response to the online availability information indicating that the content which corresponds to the selected broadcast event is available online.

6. The method of claim 1, wherein the application information includes version information for specifying a version of the application identified by the ID information.

7. The method of claim 6, wherein the version information specifies a minimum version number of the identified application, and
wherein the predefined application is only launched from the application portal in response to the predefined application having at least the minimum version number.

8. The method of claim 1, wherein the application information includes application type information for identifying a type of the application, the method further comprising:
determining whether to launch the predefined application based on the application type.

9. The method of claim 1, wherein the application information further comprises an application source identifier for identifying a network location from which the application can be obtained, the method further comprising:
connecting to the network location to launch the application in response to a determination that the ID information does not identify the predefined application.

10. The method of claim 1, wherein the apparatus is a Digital Video Broadcasting DVB receiver and the application information is received as an Application Information Table AIT, the method further comprising:
comparing organization_ID and application_ID values in the received AIT to known organization_ID and application_ID values of the predefined application, in order to determine whether the ID information identifies the predefined application.

11. A non-transitory computer-readable storage medium storing a computer program which, when executed by an apparatus for receiving a broadcast stream, causes the apparatus to perform the method of claim 1.

12. An apparatus for receiving a broadcast stream, the apparatus including an application portal for launching a predefined application, the apparatus comprising:
a processor, said processor executing the following modules:
a receiving module configured to receive application information, the application information including identification ID information for identifying the predefined application and protocol information indicating a protocol to be used to launch the identified predefined application; and
a portal control module configured to determine whether the predefined application is available from the application portal: by comparing the identification ID information for identifying the predefined application with identification ID information for the application portal in response to the ID information identifying the predefined application and the protocol information indicating the application portal, and launch the predefined application from the application portal.

13. The apparatus of claim 12, wherein the receiving module is configured to receive, prior to receiving the application information, an application information source identifier for identifying a network location from which the application information can be obtained; and
wherein the receiving module is arranged to connect to the network location to receive the application information.

14. The apparatus of claim 12, further comprising:
a broadcast service selection module configured to select one of a plurality of broadcast services from the broadcast stream, the broadcast stream including information identifying a broadcast application associated with the selected broadcast service; and
a broadcast application module configured to launch the broadcast application,
wherein the portal control module launches the predefined application from the application portal in response to a command from the broadcast application.

15. The apparatus of claim 12, wherein the predefined application is a catch-up application for accessing online content through a network connection, the apparatus further comprising:
an Electronic Programme Guide (EPG) user interface generator arranged to control a display device to display an EPG user interface for user selection of one of a plurality of broadcast events; and
a user input module arranged to receive a user command selecting one of the broadcast events,
wherein the portal control module is arranged to launch the predefined application to access online content which corresponds to the selected broadcast event.

16. The apparatus of claim 15, wherein the EPG includes online availability information which indicates whether the content which corresponds to the selected broadcast event is available online, and
wherein the portal control module is arranged to only launch the predefined application in response to the online availability information indicates that the content which corresponds to the selected broadcast event is available online.

17. The apparatus of claim 12, wherein the application information includes version information for specifying a version of the application identified by the ID information.

18. The apparatus of claim 17, wherein the version information specifies a minimum version number of the identified application, and
wherein the portal control module is arranged to only launch the predefined application from the application portal in response to the predefined application having at least the minimum version number.

19. The apparatus of claim 12, wherein the application information includes application type information for identifying a type of the application, and
wherein the portal control module is arranged to determine whether to launch the predefined application based on the application type.

20. The apparatus of claim 12, wherein the application information further comprises an application source identifier for identifying a network location from which the application can be obtained, the apparatus further comprising:
a network interface module arranged to connect to the network location to launch the application in response to a determination that the ID information does not identify the predefined application.

21. The apparatus of claim 12, wherein the apparatus is a Digital Video Broadcasting (DVB) receiver and the application information is received as an Application Information Table (AIT), and
wherein the portal control module is arranged to compare organization_ID and application_ID values in the received AIT to known organization_ID and application_ID values of the predefined application, to determine whether the ID information identifies the predefined application.

* * * * *